(12) United States Patent
Liu et al.

(10) Patent No.: US 9,998,535 B2
(45) Date of Patent: Jun. 12, 2018

(54) METHOD AND APPARATUS FOR COORDINATING MULTIPLE PEER-TO-PEER NETWORKS

(71) Applicant: Apple Inc., Cupertino, CA (US)

(72) Inventors: Yong Liu, Campbell, CA (US); Christiaan A. Hartman, San Jose, CA (US); Su Khiong Yong, Palo Alto, CA (US); Chiu Ngok E Wong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 14/703,557

(22) Filed: May 4, 2015

(65) Prior Publication Data

US 2015/0319235 A1    Nov. 5, 2015

Related U.S. Application Data

(60) Provisional application No. 61/988,115, filed on May 2, 2014.

(51) Int. Cl.

| | |
|---|---|
| *G06F 15/16* | (2006.01) |
| *H04L 29/08* | (2006.01) |
| *H04W 72/04* | (2009.01) |
| *H04W 40/24* | (2009.01) |
| *H04L 12/703* | (2013.01) |
| *H04L 12/715* | (2013.01) |
| *H04W 84/12* | (2009.01) |

(52) U.S. Cl.
CPC .... *H04L 67/1093* (2013.01); *H04L 29/08072* (2013.01); *H04L 45/28* (2013.01); *H04L 45/64* (2013.01); *H04L 67/1063* (2013.01); *H04L 67/1074* (2013.01); *H04W 40/24* (2013.01); *H04W 40/244* (2013.01); *H04W 72/0446* (2013.01); *H04L 67/104* (2013.01); *H04W 84/12* (2013.01)

(58) Field of Classification Search
CPC ............................ H04L 67/104; H04L 47/125
USPC ........ 709/220, 224, 227, 238, 246; 370/235, 370/330
See application file for complete search history.

(56) References Cited

U.S. PATENT DOCUMENTS

| | | | |
|---|---|---|---|
| 8,443,086 B2* | 5/2013 | Hsu ........................ | H04L 67/104 707/622 |
| 8,495,244 B2* | 7/2013 | Bonar ................... | H04B 7/0689 709/239 |
| 8,933,733 B2* | 1/2015 | Choke .................... | H03L 7/083 327/148 |
| 9,144,013 B2* | 9/2015 | Kondabattini .... | H04W 52/0209 |
| 9,144,047 B2* | 9/2015 | Park ...................... | H04W 56/00 |

(Continued)

*Primary Examiner* — Khanh Dinh
(74) *Attorney, Agent, or Firm* — Sterne, Kessler, Goldstein & Fox, P.L.L.C.

(57) ABSTRACT

An apparatus and methods are provided for coordinating multiple peer-to-peer (P2P) networks. A device operates a first P2P communications protocol to participate in a first P2P network. The device also operates a second P2P communications protocol to participate in a second P2P network. The device can modify at least one of the first P2P network's parameters and at least one of the second P2P network's parameters to minimize conflicts between operations of the P2P networks. To enable it to modify these parameters, the device may configure or reconfigure its operating parameters to cause it to take on a supervisory role (e.g., master, group owner).

20 Claims, 13 Drawing Sheets

(56) References Cited

U.S. PATENT DOCUMENTS

| | | | |
|---|---|---|---|
| 9,185,641 B2 * | 11/2015 | Ilsar .................... | H04W 48/16 |
| 9,584,482 B2 * | 2/2017 | Burns .................... | H04L 12/66 |
| 9,622,075 B2 * | 4/2017 | Ali ....................... | H04W 12/06 |
| 2005/0036470 A1 * | 2/2005 | Calvert .................. | H04L 45/00 |
| | | | 370/338 |
| 2010/0185753 A1 * | 7/2010 | Liu ..................... | H04L 65/4084 |
| | | | 709/219 |
| 2013/0286942 A1 * | 10/2013 | Bonar ................ | H04B 7/0689 |
| | | | 370/328 |
| 2014/0003237 A1 * | 1/2014 | Kenney ............... | H04W 28/10 |
| | | | 370/235 |
| 2014/0269473 A1 * | 9/2014 | Kondabattini .... | H04W 52/0209 |
| | | | 370/311 |

* cited by examiner

METHOD AND APPARATUS FOR COORDINATING MULTIPLE PEER-TO-PEER NETWORKS

RELATED APPLICATIONS

This application claims priority under 35 U.S.C. § 119 to U.S. Provisional Application No. 61/988,115, entitled "Method and Apparatus for Coordinating Multiple Peer-to-peer Networks", by the same inventors, filed on 2 May 2014, and the contents of which are incorporated herein by reference.

BACKGROUND

Apparatus and methods are provided for conducting peer-to-peer communications.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary routing and processing of communications through other devices.

Some other technologies that allow for peer-to-peer communications require significant power consumption by individual nodes, which is a principal concern for devices that rely on battery power (e.g., smartphones, tablets, laptop and notebook computers). Excessive power consumption by a peer might be caused by inefficient discovery of services and/or other devices, by having to act as a central node, by inefficient use of the device's transceiver, and/or other factors. For example, requiring a device to continually or regularly poll or query other devices will cause it to consume significant amounts of power, especially for a wireless device travelling through different spatial regions.

Further, some networking technologies or protocols that support peer-to-peer communications do not coexist well with other technologies. For example, in a wireless environment, some peer-to-peer protocols are not flexible enough to share a device's radio, antenna and/or frequency spectrum with other protocols or between applications (e.g., to maintain a Bluetooth® connection), or to share such a resource efficiently.

SUMMARY

An apparatus and methods are provided for coordinating multiple peer-to-peer (P2P) networks. A device operates a first P2P communications protocol to participate in a first P2P network. The device also operates a second P2P communications protocol to participate in a second P2P network. The device can modify at least one of the first P2P network's parameters and at least one of the second P2P network's parameters to minimize conflicts between operations of the P2P networks. To enable it to modify these parameters, the device may configure or reconfigure its operating parameters to cause it to take on a supervisory role (e.g., master, group owner).

In some embodiments, when modifying at least one of the first P2P network's parameters and at least one of the second P2P network's parameters, the device can perform any/all of the following actions: the device may stagger operations of the first P2P network and the second P2P network in alternating time intervals; the device may cause the first P2P network and the second P2P network to operate simultaneously over the same wireless channel; and/or the device may set a beacon interval longer than a default interval in the first P2P network and/or the second P2P network.

DETAILED DESCRIPTION

Figure 1:
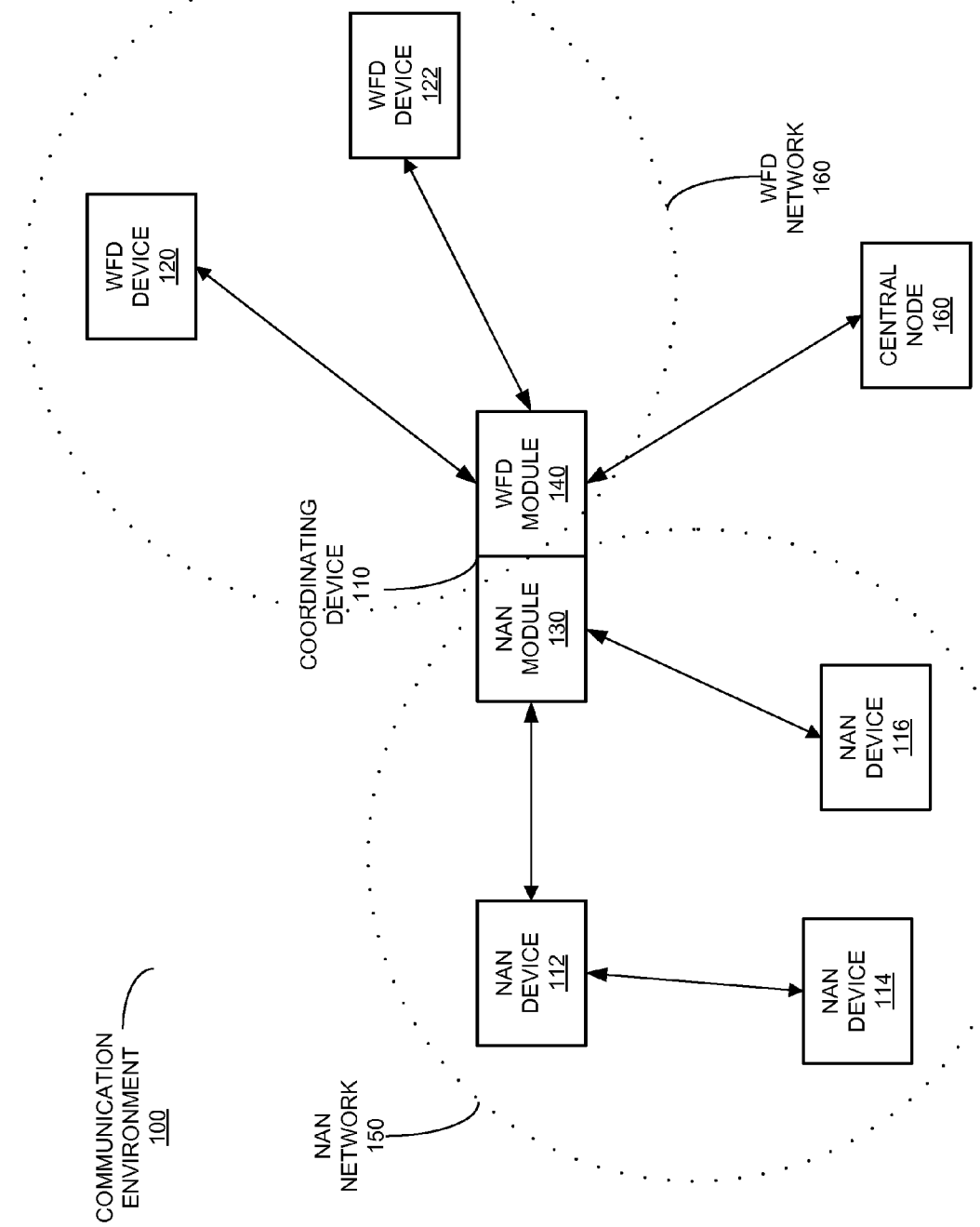
FIG. 1 illustrates an example communication environment.

The following description is provided in the context of a particular application and its requirements. Various modifications to the disclosed embodiments will be readily apparent to those skilled in the art, and the general principles defined herein may be applied to other embodiments and applications.

In some embodiments, apparatus and methods are provided for efficiently conducting peer-to-peer (P2P) communications while satisfying multiple competing demands on a mobile device's shared communication resources. In these embodiments, the device participates in a synchronized P2P networking environment and also hosts applications and/or services that have their own communication requirements, such that at different times the device can use those resources for different purposes. In some embodiments, the P2P networking environment may represent a Neighbor Awareness Networking (NAN) network.

When a device interrupts an ongoing data exchange (e.g., a file transfer, a game) to satisfy a competing demand, the device plans a sequence of frequency/channel changes to accommodate the demands. The partner(s) in the data exchange are advised of the schedule so that they may accompany the device (i.e., meet the device on one or more of the channels). In some cases, the competing demand may comprise operations associated with a Wi-Fi Direct® (WFD) network. A device that participates in both a NAN network and a WFD network may be referred to as a coordinating device.

As the device conducts the frequency changes, and depending on the nature of the communication demand(s) being accommodated, the device and the partner(s) can continue their data exchange, to the extent that the partner(s) are able to meet on at least one or more of the other frequencies. For example, if the device is conducting a channel scan (either active or passive), issuing or receiving a beacon, or conducting some other non-intensive communications, it will be able to continue the data exchange during some of the time it is tuned to a channel on which those communications are conducted.

Introduction

A P2P wireless communication environment may be characterized by any number of devices of the same type and/or different types—such as smartphones, tablets, personal digital assistants, wearable devices, laptop and desktop computers and so on. Different devices can have different features, may execute different applications, may have different power levels (e.g., battery capacity and charge), different communication needs, different loads (e.g., on a processor, on an antenna), may be heard by other devices with varying signal strengths, etc. In addition, the communication environment may be fluid, with devices entering, moving through, and exiting the region encompassing the environment.

Embodiments disclosed herein enable devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a master (or having some other supervisory role) exits the environment; and/or are scalable to accommodate dense environments having many devices. These and other features and advantages are described below.

Communication Environment

FIG. 1 illustrates the communication environment 100 in accordance with an embodiment. Communication environment 100 includes a number of computer systems, which can include any type of computer system based on a microprocessor and/or a digital signal processor. More specifically, communication environment 100 illustrates a communication environment where coordinating device 110 acts as the master of NAN network 150 and as the group owner of WFD network 160.

Here, NAN network 150 may represent a wireless P2P network that includes NAN devices 112-116 and coordinating device 110. As members of the same NAN network, these devices are able to communicate directly with each other, and may be configured as a cluster of any suitable depth, with one of them acting as an anchor master and possibly one or more other devices acting as additional masters. In some implementations, coordinating device 110 configures itself to act as anchor master by appropriately setting a master preference value or other associated parameter.

In some embodiments, central node 160 is an access point. Coordinating device 110 may maintain an infrastructure connection with central node 160 in order to participate in a traditional Wi-Fi network.

Coordinating device 110, NAN devices 112-116, and WFD devices 120, 122 may be any computing device(s) capable of wireless local area network (WLAN) communication that includes computational capability, such as PDAs, tablet computers, laptops, desktops, smartphones, wearable devices and cell phones.

Coordinating device 110, in particular, includes NAN module 130 and WFD module 140. NAN module 130 may include software or firmware that enables coordinating device 110 to participate in a NAN network. WFD module 140 may include software or firmware that enables coordinating device 110 to participate in a WFD network.

Note that different embodiments of the present invention may feature operating environments and devices having configurations other than those depicted in FIG. 1.

Coordinating Multiple Networks Using Different P2P Protocols

Figure 2:
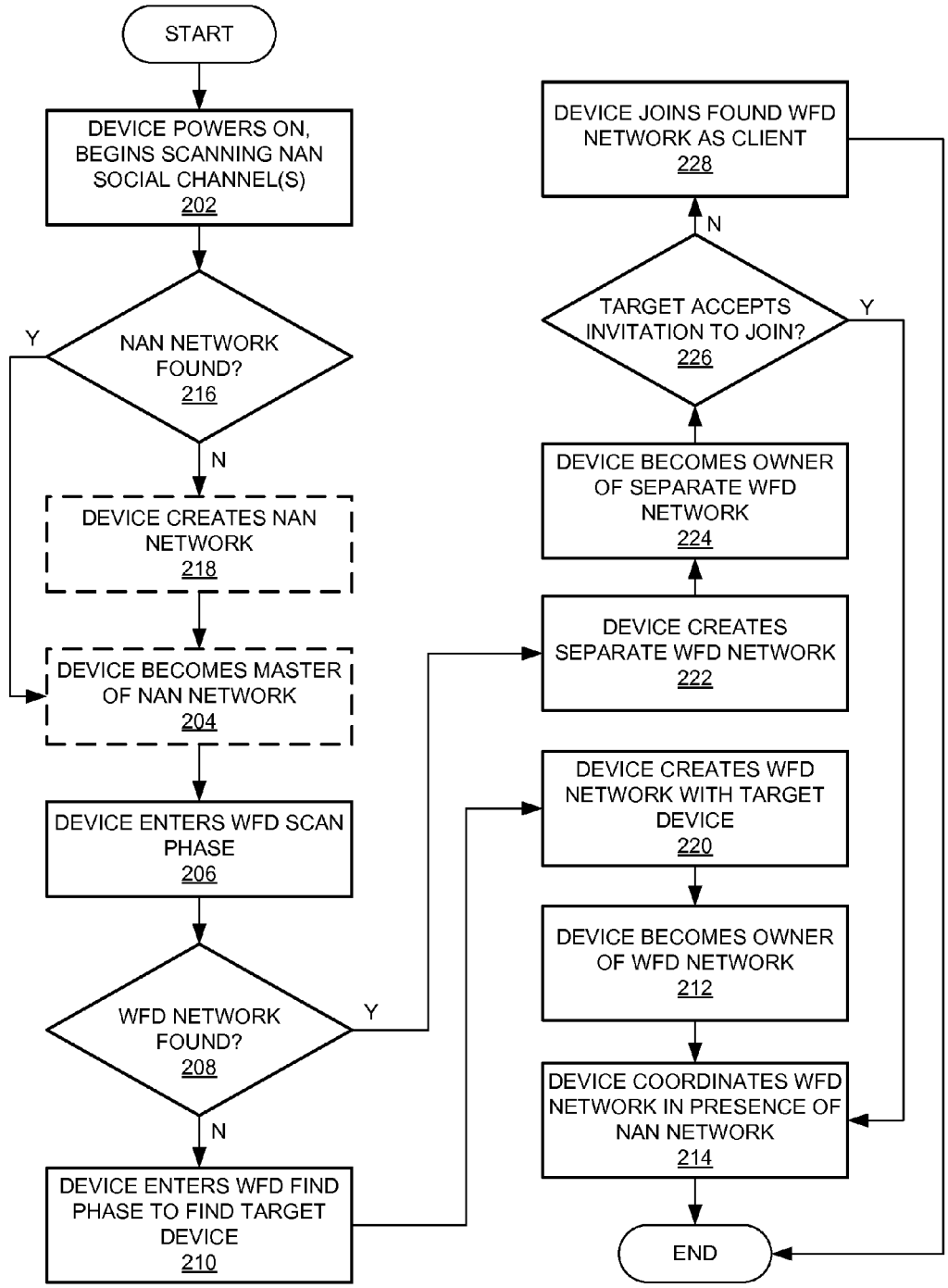
FIG. 2 presents a flowchart illustrating an example process of coordinating multiple wireless networks that use different P2P protocols.
Figure 3A:
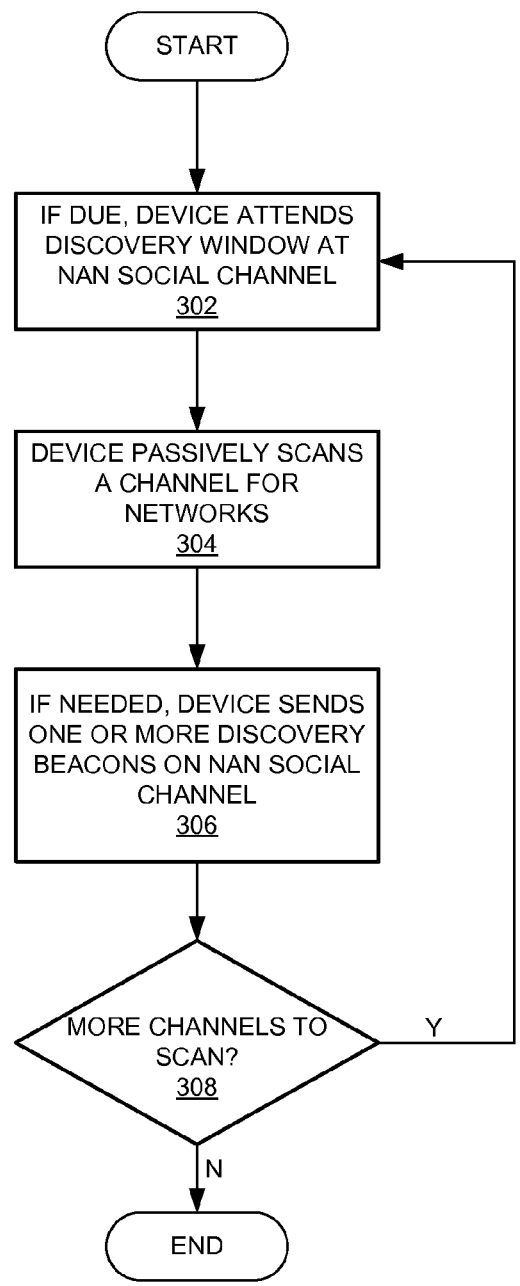
FIG. 3A presents a flowchart illustrating an example process of coordinating NAN-specific operations with passive scan operations for a scan phase process.
Figure 4:
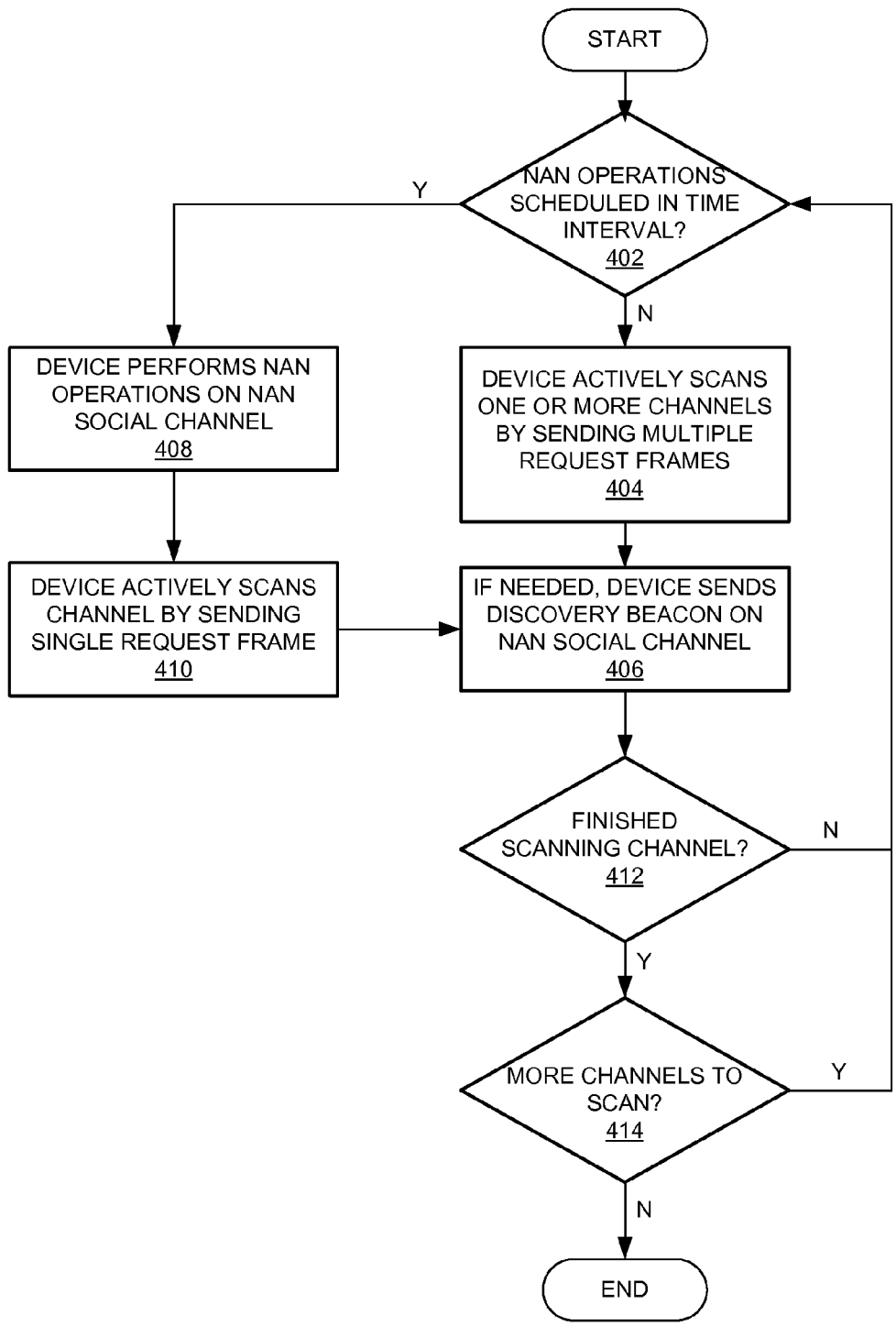
FIG. 4 presents a flowchart illustrating an example process of coordinating NAN-specific operations with active scan operations for a scan phase process.
Figure 5A:
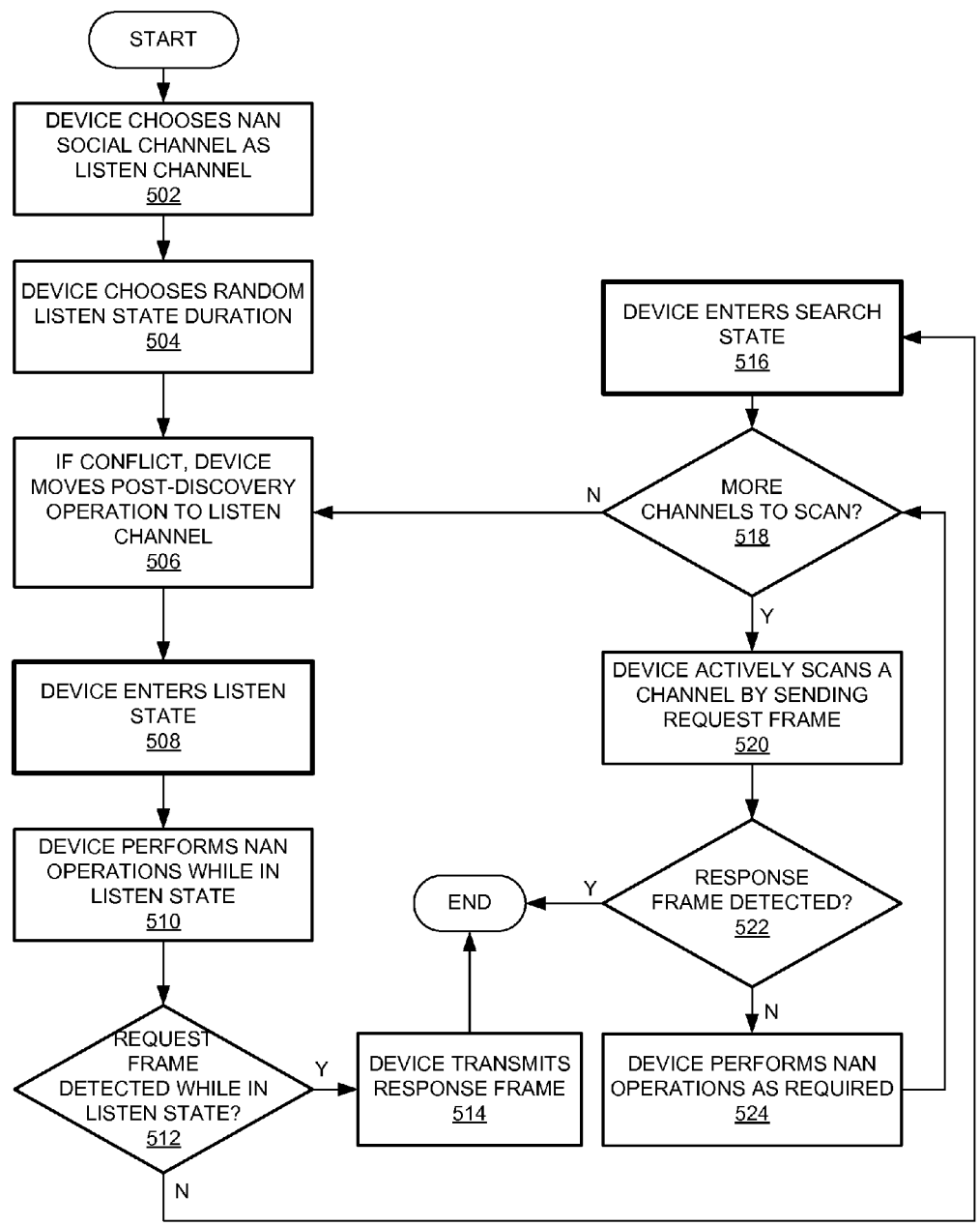
FIG. 5A presents a flowchart illustrating an example process of coordinating NAN-specific operations with various operations for a find phase process.
Figure 6A:
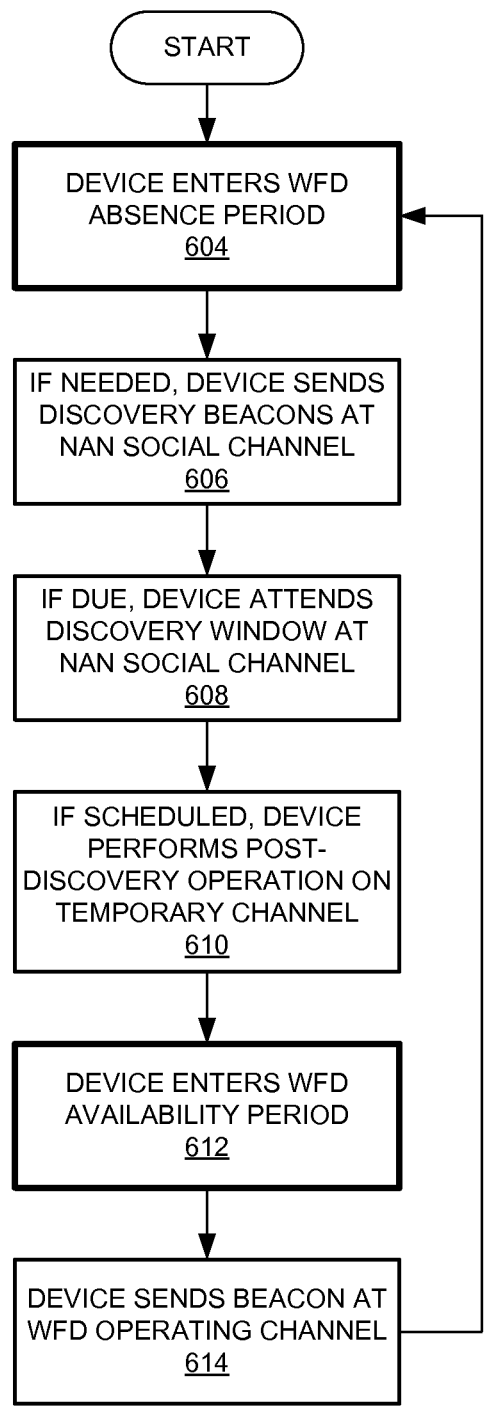
FIG. 6A presents a flowchart illustrating an example process of coordinating NAN-specific operations with WFD-specific operations.
Figure 7A:
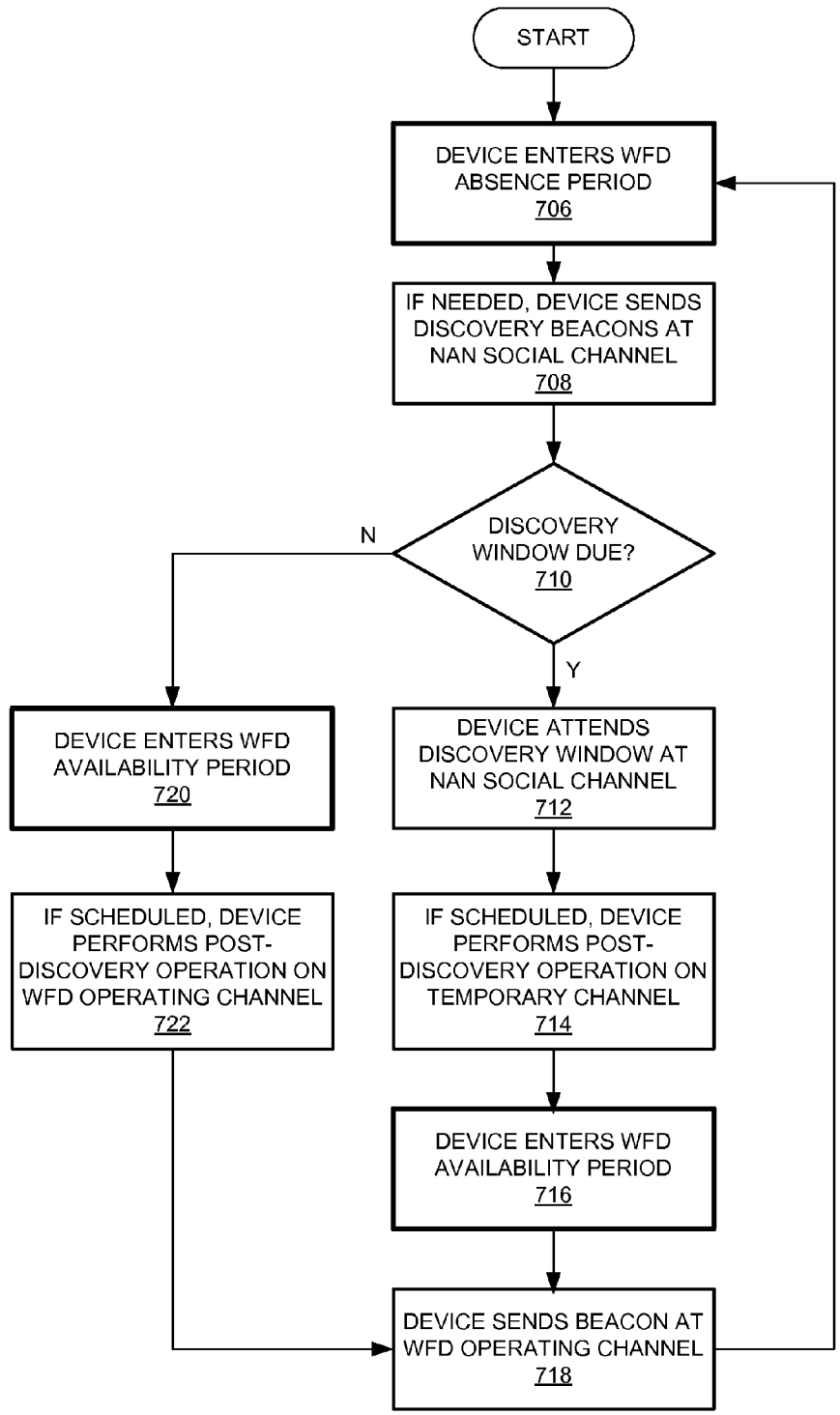
FIG. 7A presents a flowchart illustrating an example process that uses additional optimizations to coordinate NAN-specific operations with WFD-specific operations.

FIG. 2 provides an example of the actions a coordinating device may take as it attempts to assume or obtain a master role in a NAN network and a group owner role in a WFD network. The flowcharts found in FIG. 3A and FIG. 4 provide examples of how the coordinating device coordinates a WFD scan phase process in the presence of a NAN network. The flowchart found in FIG. 5A provides an example of how the coordinating device coordinates a WFD find phase process in the presence of a NAN network. The flowcharts found in FIG. 6A and FIG. 7A provide examples of how the coordinating device can schedule both NAN-specific operations and WFD-specific operations (also known as Group operations) in a way that minimizes time and channel conflicts, thereby reducing wireless channel congestion and improving the user's experience.

Initially, a coordinating device may have no knowledge of any networks or devices within range. The coordinating device may scan NAN social channels to determine if an existing NAN network is within range (operation 202). Note that NAN social channels may include channel 6 in the 2.4 gigahertz (GHz) band and channel 149 in the 5 GHz band. Once the coordinating device detects an existing NAN network, the coordinating device may attempt to negotiate with other NAN devices within the existing NAN network to become the anchor master of the NAN network (optional operation 204) or a master subordinate to the anchor master. While conducting negotiations for the master role, the coordinating device may set a high master preference value in frames sent to other NAN devices. Once the coordinating device has obtained the master role, the other NAN devices may act as secondary masters or as non-master devices (e.g., leaves).

In some embodiments, however, the coordinating device may join the NAN network as a non-master device and allow another NAN device on the NAN network to be the NAN master. This has the advantage of freeing the coordinating device from the responsibility of having to transmit discovery beacons or participate in every discovery window, thereby providing the coordinating device more time and longer time intervals with which to handle its responsibilities as the group owner of a WFD network. In this situation, while the coordinating device may not possess the ability to reschedule any NAN-specific operations, the coordinating device still has the option of rescheduling WFD-specific operations to avoid time and/or channel conflicts with NAN-specific operations scheduled by the master of the NAN network (which in this case, is another NAN device).

If the coordinating device fails to find an existing NAN network within range (decision 216), the coordinating device may create its own NAN network (optional operation 218) and serve as the newly created NAN network's anchor master (optional operation 204). U.S. patent application Ser. No. 13/913,278, entitled "Method and Apparatus for Cooperative Channel Switching" and filed 17 Jun. 2013 discloses systems and methods for detecting a NAN network, interacting with a NAN network, and negotiating with the NAN network to become the network's master, and is incorporated herein by reference in its entirety.

In addition to becoming the master of a NAN network, a coordinating device can become the group owner of a Wi-Fi Direct network. Wi-Fi Direct (WFD) is a solution for providing Wi-Fi-based device-to-device connectivity. A WFD network includes both a group owner and one or more clients. The group owner of a WFD network provides connectivity between other devices (clients) in the WFD network, much like a wireless access point in an infrastructure-based WLAN. WFD devices connect to the group owner in a manner similar to that in which a client device connects to a wireless access point in a WLAN network. While any WFD device possesses the capability to act as a group owner, WFD devices within a WFD network negotiate among themselves to elect a group owner.

To establish contact with other WFD devices, a coordinating device participates in the WFD device discovery and WFD group formation processes. First, the coordinating device engages in a scan phase process (operation 206) in order to find existing WFD networks. Note that the coordinating device may also use a scan phase process for finding infrastructure access points (APs) and/or for other purposes, e.g., related to location detection. While engaged in a scan phase process, the coordinating device collects information about surrounding devices or networks by scanning all available channels for either (1) beacons sent by group owners of existing WFD networks (wherein the beacon is sent on the existing WFD network's operating channel) via passive scanning or (2) response frames via active scanning. While passive scanning may take longer than active scanning, the former may save power and avoid congesting channels. Additionally, regulatory requirements may forbid the coordinating device from using active scanning. If the coordinating device discovers an existing WFD network (decision 208), wherein the existing WFD network contains a target WFD device that the coordinating device wants to communicate with, the coordinating device has two options. The coordinating device may establish a separate WFD network with itself as the group owner (operations 222 and 224) and invite the target WFD device to leave the existing WFD network and join the coordinating device's WFD network (decision 226). If the target WFD device agrees, the coordinating device may communicate with the target WFD device within a modifiable schedule. Alternatively, if the target WFD device does not leave the existing WFD network, the coordinating device can join the existing WFD network as a client (operation 228). In this case, the coordinating device cannot alter the schedule of the WFD network.

If the coordinating device does not find an existing WFD network after scanning all available channels (decision 208), the coordinating device may enter a find phase process (operation 210) to find WFD devices that are not yet part of a WFD network. In situations where two WFD devices, which are within close physical proximity, are powered up simultaneously, both devices may eventually enter find phase if no existing WFD networks are in range. Note that a device in a find phase process cycles between a listen state and a search state. Here, the duration of a device's listen state is chosen randomly, thereby ensuring that the two devices in the find phase will eventually discover each other. A device in a search state transmits one or more request frames on WFD social channels, including channels 1, 6, and 11 of the 2.4 GHz band. Meanwhile, a device in the listen state dwells on a given channel (also referred to as the listen channel) before cycling back to a search state. A device may listen on any WFD social channel. Eventually, a first device in a search state may transmit a request frame that is received by a second device in a listen state, causing the second device to respond with a matching response frame. At this point, the two devices may engage in group owner negotiation to form a new WFD network (operations 220 and 212).

In order to communicate its desire to be the group owner of a new WFD network, a device may transmit its group owner Intent attribute to another device. During group owner negotiation, the coordinating device may set an Intent field in a group owner Intent attribute to a value that indicates a strong desire to become the group owner. For example, the group owner Intent attribute may be set to a particular value, e.g., 15, to indicate that the coordinating device must be the group owner to operate correctly as a member of the resulting WFD network. After transmitting the Intent attribute with another WFD device via group owner Negotiation frames, the coordinating device may become the group owner. Note that a group owner negotiation only occurs between two devices. Once a WFD network is formed from the two devices, wherein the winner of the group owner negotiation becomes the group owner, other devices may connect to the group owner to join the WFD network. At this point, having engaged in a scan phase process and a find phase process, the coordinating device proceeds to WFD group operation as the group owner of a WFD network.

Note that in some embodiments, a coordinating device may skip the scan phase and find phase processes, opting instead to immediately create a WFD network with itself as the group owner. This course of action is referred to as serving as an autonomous group owner. A coordinating device that serves as an autonomous group owner may begin transmitting beacons on the WFD network's operating channel periodically, e.g., every 128 TU, thereby enabling other WFD devices to discover the WFD network via their own scan phase processes.

After becoming the group owner of a WFD network, the coordinating device may modify the timing of various operations for either network to minimize conflicts between NAN-specific operations and WFD-specific operations (operation 214). As the member of a NAN network, the coordinating device may be required to perform NAN-specific discovery operations and NAN-specific post-discovery operations. Discovery operations may comprise attending NAN discovery windows and, if the coordinating device is serving as a NAN master, transmitting NAN discovery beacons. NAN discovery beacons are transmitted to assist newly arrived NAN devices in discovering the NAN network. A NAN discovery window is a period of time during which NAN devices within the NAN network rendezvous to facilitate management or operation of the NAN network, discover other NAN devices, and advertise and discover services provided by NAN devices that form the NAN network. During a discovery window, a master of a NAN network may transmit a synchronization beacon to help other NAN devices stay synchronized to the NAN network's schedule of operation. The schedule for post-discovery operations, wherein post-discovery operations comprise further service discovery and actual data transfers between NAN devices, are advertised during a discovery window. Post-discovery operations may illustratively occur immediately after a discovery window, or at some other time. Note that while discovery operations generally take place on the NAN network's social channel, post-discovery operations may, under the agreement of NAN devices that are to participate in the post-discovery operation, take place on a channel other than the NAN network's social channel (such channels may be referred to as temporary channels).

As a group owner of a WFD network, the coordinating device may also be required to perform WFD-specific operations, such as periodically transmitting beacons to synchronize the WFD group member devices and assist newly arrived WFD devices in discovering the WFD network. Additionally, the coordinating device may schedule absence periods and availability periods for the WFD network. An availability period is an interval of time where the group owner is present to handle WFD-specific operations. For example, the group owner may transmit beacons during availability periods. An absence period is an interval of time where the group owner is scheduled to be absent from the WFD network. Thus, the coordinating device may schedule absence periods for a WFD network and use those absence periods to focus on NAN-specific operations.

Generally, the schedule of a NAN network repeats, e.g., every 512 TU. For example, a NAN network may be required to implement a discovery window for a single NAN social channel once every 512 TU. Thus, for example, if a NAN network uses NAN social channels on both channel 6 of the 2.4 GHz band and channel 149 of the 5 GHz band, the NAN network may implement a discovery window for channel 6 at the start of each 512 TU time interval and a discovery window for channel 149 at the 128 TU mark of each 512 TU time interval. Additionally, a NAN network generally schedules NAN-specific operations within a 512 TU time interval at increments of, e.g., 16 TU or 128 TU. For example, the NAN network may schedule post-discovery operations at the 128 TU mark, the 256 TU mark, or the 384 mark of a given 512 TU time interval.

In contrast, WFD-specific operations may not fit cleanly into the schedule of a NAN network. For example, actively scanning a WFD-social channel may require, e.g., 40 TU while passively scanning a WFD-social channel may require, e.g., 110 TU. Additionally, the duration of a listen state of a WFD find phase process, may last, e.g., 100 TU, 200 TU, or 300 TU. Finally, the group owner of a WFD network may be required to transmit a beacon every, e.g., 100 TU.

By rescheduling various WFD-specific operations to fit cleanly into the schedule of a NAN network, the disclosed embodiments may minimize time and channel conflicts between NAN-specific operations and WFD-specific operations. This in turn, may reduce wireless network congestion and generally improve the latency and throughput of wireless communications for NAN networks that are in close proximity to a WFD network. For example, a coordinating device may reschedule the beacon transmissions of a WFD network to cleanly fit into a NAN network's schedule by changing the WFD network's beacon interval, e.g., from a default of 100 TU to 128 TU. Additionally, the coordinating device may reschedule one or more WFD-specific operations to begin, e.g., at a 16 TU or a 128 TU subdivision of a 512 TU time interval.

Coordinating WFD Scan Phase in Presence of NAN Network

FIG. 3A and FIG. 4 illustrate how a coordinating device may schedule and perform NAN-specific operations as the NAN network's master while scanning for existing WFD networks in the scan phase.

Using communication environment 100 of FIG. 1 as an example, coordinating device 110 can initialize WFD module 140 and enter a scan phase process to search for existing networks. This can be performed, e.g., when coordinating device 110 is the master of a NAN network, e.g., NAN network 150.

While in a scan phase process, coordinating device 110 can scan a number of available channels to discover WFD devices or networks within range. As the master of NAN network 150, however, coordinating device 110 is still required to perform NAN operations while the scan phase process is underway.

FIG. 3A provides a flowchart that illustrates how a device, such as coordinating device 110, may interleave NAN-specific operations between passive scanning operations for a scan phase process. Passively scanning a channel for beacons generally requires a minimum of 112 Time Units (TU). Therefore, coordinating device 110 may first determine whether a discovery window would be due at the start of the passive scan. If so, coordinating device 110 may schedule a discovery window to take place before the start of the passive scan. As coordinating device 110 follows the schedule, it may attend the discovery window at NAN network 150's operating channel (operation 302). For example, NAN network 150's operating channel may be, e.g., channel 6 of the 2.4 GHz band.

Next, coordinating device 110 may passively scan a channel for networks by listening for beacon frames (operation 304). If the channel being scanned happens to be a different channel than the NAN network's operating channel, coordinating device 110 may have a small transition period for its wireless interface to switch channels prior to scanning the channel. After each passive scan, a discovery beacon transmission is generally due for NAN network 150. Note that to meet discovery beacon density requirements, coordinating device 110 may be required to transmit an average of one discovery beacon every 128 TU over NAN network 150, or with some other specified average periodicity. To fulfill this requirement, coordinating device 110 may transmit a discovery beacon after each passive scan (operation 306). Afterwards, if not every channel has been scanned in this scan phase instance (decision 308), coordinating device 110 may return to operation 302 and scan another channel. Otherwise, coordinating device 110 may exit the scan phase process.

Note that coordinating device 110 may advance or defer discovery beacon transmissions within NAN network 150's schedule to create a time interval, e.g., of up to 256 TU, between consecutive discovery beacon transmissions. In doing so, coordinating device 110 can create a longer contiguous time interval for passive scanning. Providing longer time intervals for passive scanning may increase the efficacy of the passive scans and reduce time lost due to channel switching. To fulfill the discovery beacon density requirement, coordinating device 110 may transmit multiple discovery beacons in relatively short succession between passive scans.

Furthermore, in order to free up more time intervals for passive scanning, coordinating device 110 may cancel one or more discovery windows. For example, if a scheduled discovery window is to take place on a channel within the 5 GHz band, coordinating device 110 may omit this discovery window from NAN network 150's schedule, or may simply not attend such a discovery window.

Figure 3B:
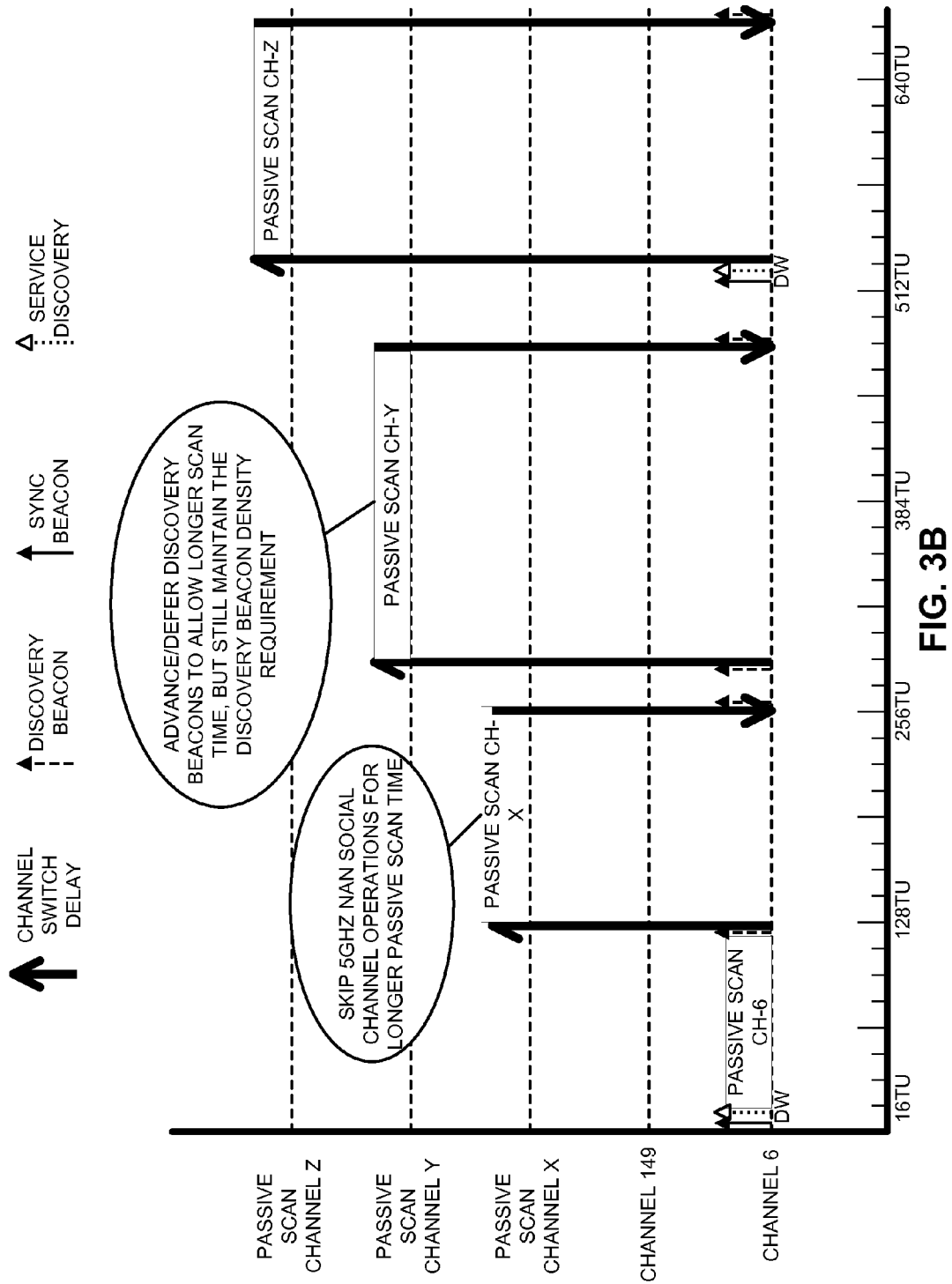
FIG. 3B presents a time graph illustrating an example schedule that coordinates NAN-specific operations with passive scan operations for a scan phase process.

FIG. 3B presents a time graph that illustrates an example schedule followed by coordinating device 110 as it progresses through the operations of the flowchart shown in FIG. 3A. In some embodiments, coordinating device 110 can attend a discovery window on channel 6 of the 2.4 GHz band, which lasts until approximately 16 TU. During the discovery window, coordinating device 110 may transmit a sync beacon and/or participate in service discovery for NAN network 150. Next, coordinating device 110 can passively scan channel 6 for WFD devices and/or networks until approximately 128 TU. At approximately 128 TU, coordinating device 110 can perform a discovery beacon transmission, which is due for NAN network 150. Then, coordinating device 110 can switch channels to passively scan channel X for WFD devices and/or networks until approximately 256 TU. Next, coordinating device 110 can switch channels back to channel 6 to perform a discovery beacon transmission for NAN network 150. In some embodiments, coordinating device 110 may perform more than one discovery beacon transmissions in a short span of time to meet a minimum rate of discovery beacon transmissions. At approximately 288 TU, coordinating device 110 can switch channels to passively scan channel Y for WFD devices and/or networks until approximately 480 TU. Then, coordinating device 110 can switch channels back to channel 6 to perform a discovery beacon transmission for NAN network 150. In some embodiments, if a second discovery window is due for NAN network 150, coordinating device 110 may attend the second discovery window from approximately 512 TU to approximately 528 TU. At approximately 528 TU, coordinating device 110 can switch channels to passively scan channel Z for WFD devices and/or networks until approximately 672 TU. Then, coordinating device 110 can switch channels back to channel 6 to perform a discovery beacon transmission for NAN network 150.

FIG. 4 provides an example flowchart of how a device may interleave NAN-specific and WFD-specific operations to maintain a NAN network while actively scanning for existing networks. While the use of passive scanning may save power and reduce channel congestion, passive scanning may not leave enough time for both discovery windows and post-discovery operations to take place in situations where post-discovery operations are scheduled after discovery windows. Through use of active scanning, a device, e.g., coordinating device 110, can use smaller time intervals to scan a channel. Additionally, because the efficacy of active scanning does not depend on the length of the time interval allocated, the device can divide the scanning of a single channel into non-contiguous time intervals.

In the example of FIG. 1, before actively scanning a channel, coordinating device 110 determines whether a discovery beacon is due to be transmitted on NAN network 150's social channel or some post-discovery operation is due on a temporary channel (decision 402). Note that a discovery beacon transmission is generally transmitted over a NAN social channel, for example either channel 6 of the 2.4 GHz band or channel 149 of the 5 GHz band. If no NAN-specific operations are due within the time interval in question, coordinating device 110 may schedule multiple channels to be scanned or a single channel to be scanned multiple times by transmitting multiple request frames (operation 404). For example, coordinating device 110 may spend around 80 TU to transmit two request frames, one after the other.

Alternatively, if a NAN-specific operation is due (decision 402), coordinating device 110 can perform the NAN-specific operation(s) on the appropriate channel. Here, coordinating device 110 may need to shorten the active scanning time interval to provide time for performing the NAN-specific operations (operations 408-410).

Further, coordinating device 110 may transmit a discovery beacon to fulfill the discovery beacon density requirement (operation 406). Coordinating device 110 also can determine whether the channel requires another interval of active scanning (decision 412). If so, coordinating device 110 returns to decision 402 and continues the active scan. Once all channels have been scanned (decision 414), coordinating device 110 may exit the scan phase.

If coordinating device 110 discovers the existing WFD network of which WFD device 120 serves as a group owner (e.g., during a scan phase), the coordinating device 110 may create WFD network 160 with itself as the group owner. Coordinating device 110 may then invite WFD device 122 to leave the existing WFD network and join WFD network 160. If WFD device 122 accepts, WFD device 122 joins WFD network 160. Additionally, coordinating device 110 may invite WFD device 120 to join WFD network 160. If WFD device 120 accepts, WFD device 120 joins WFD network 160, which destroys the existing WFD network. Coordinating device 110 may proceed to set the schedule of WFD network 160 to minimize reduce time and channel conflicts with NAN-specific operations.

Coordinating WFD Find Phase in Presence of NAN Network

FIG. 5A illustrates an example of how a coordinating device may schedule and perform NAN-specific operations as the NAN network's master while searching, in a find phase process, for a WFD device to join with in creating a new WFD network.

Using communication environment 100 of FIG. 1 as an example, coordinating device 110 can be the master of NAN network 150 and NAN devices 112-116 can be non-master devices.

Upon entering a find phase process, coordinating device 110 chooses a listen channel. To make it possible for coordinating device 110 to conduct NAN operations while in the listen state, coordinating device 110 may choose NAN network 150's social channel (e.g., channel 6 of the 2.4 GHz band, which is also a WFD social channel) as its listen channel (operation 502). In some embodiments, coordinating device 110 may choose another channel as its listen channel.

Next, coordinating device 110 determines how long its listen duration will be (operation 504) by randomly choosing an integer, e.g., between zero and four. After choosing the integer, coordinating device 110 multiples the integer by a period, e.g., 100 TU, and uses the result as its listen duration. For example, if coordinating device 110 chooses two, the resulting listen period shall be 200 TU. In some embodiments, coordinating device 110 may set a "maxDiscoverableInterval" variable to two to ensure that it may not obtain an integer higher than two, thereby capping its listen duration at 200 TU. WFD device 120 may choose a different WFD social channel (e.g., channel 11) as its listen channel. In determining its listen duration, WFD device 120 also may randomly choose the integer, e.g., three resulting in a listen period of 300 TU. Although coordinating device 110 and WFD device 120 have different listening channels, both devices will transmit request frames on all WFD social channels while in a search state, thereby enabling any WFD device in a listen state to receive the request frame and transmit a corresponding response frame. Note that after transmission of a request frame, coordinating device 110 may spend around, e.g., 40 TU, waiting to detect a corresponding response frame. Additionally, because coordinating device 110 and WFD device 120 have different listen durations (e.g., 200 TU vs. 300 TU), communication environment 100 will eventually reach a state where one of the devices enters a listen state while the other is transmitting a request frame. Therefore, the find phase process guarantees that coordinating device 110 and WFD device 120 will eventually discover each other.

Prior to entering a listen state, coordinating device 110 determines whether the upcoming listen state period has a time conflict with a scheduled post-discovery operation. Note that although NAN network 150's social channel and coordinating device 110's listening channel may be the same, a post-discovery operation within NAN network 150 may be arranged to take place on a temporary channel that is different from the social channel, depending on how soon the post-discovery operation follows a discovery window. In cases where the post-discovery operation immediately follows a discovery window (which takes place on the social channel), the post-discovery operation is may take place on the social channel (e.g., channel 6) to avoid unnecessary channel switching. However, post-discovery operations that are not adjacent in time to a discovery window may occur on a temporary channel that is different from the social channel.

If an upcoming listen state period has a time conflict with a post-discovery operation that will occur on a temporary channel, coordinating device 110 may move the post-discovery operation to the listen channel (operation 506), thereby enabling coordinating device 110 to attend the listen state period and perform the post-discovery operation. For example, if the post-discovery operation is to occur on channel 1 and coordinating device 110's listen channel is NAN network 150's social channel (e.g., channel 6). Coordinating device 110 may move the post-discovery operation to NAN network 150's social channel. Alternatively, coordinating device 110 may defer entering into the listen state, opting to remain in the search state until after it performs the post-discovery operation on channel 1.

Next, coordinating device 110 enters into a listen state (operation 508) for a time interval. During this time interval, coordinating device 110 may perform NAN operations that are due (operation 510). For example, coordinating device 110 may transmit discovery beacons, attend discovery windows, and/or perform post-discovery operations. Additionally, if coordinating device 110 detects a request frame from WFD device 120 while in the listen state (decision 512), coordinating device 110 may transmit a corresponding response frame (operation 514) and proceed to exit the find phase process. If coordinating device 110 has not detected a request frame by the time the listen state period has ended, coordinating device 110 transitions back to a search state (operation 516).

While in the search state, coordinating device 110 will iterate through all channels and send a request frame on each channel in an attempt to contact a WFD device that might be listening on that channel. Thus, if coordinating device 110 has not scanned every available channel in the current search state period (decision 518), coordinating device 110 proceeds to transmit a request frame on another available channel (operation 520).

If coordinating device 110 detects a matching response frame from WFD device 120 (decision 522), coordinating device 110 may exit the find phase process to initiate group owner negotiation with WFD device 120. Otherwise, coordinating device 110 proceeds to scan the rest of the channels. In between active scans, coordinating device 110 may switch back to NAN network 150's social channel to perform NAN-specific operations as needed (operation 524). Additionally, if coordinating device 110 encounters a post-discovery operation that is scheduled to occur on a temporary channel, coordinating device 110 may switch to the temporary channel to handle the post-discovery operation (operation 524).

Figure 5B:
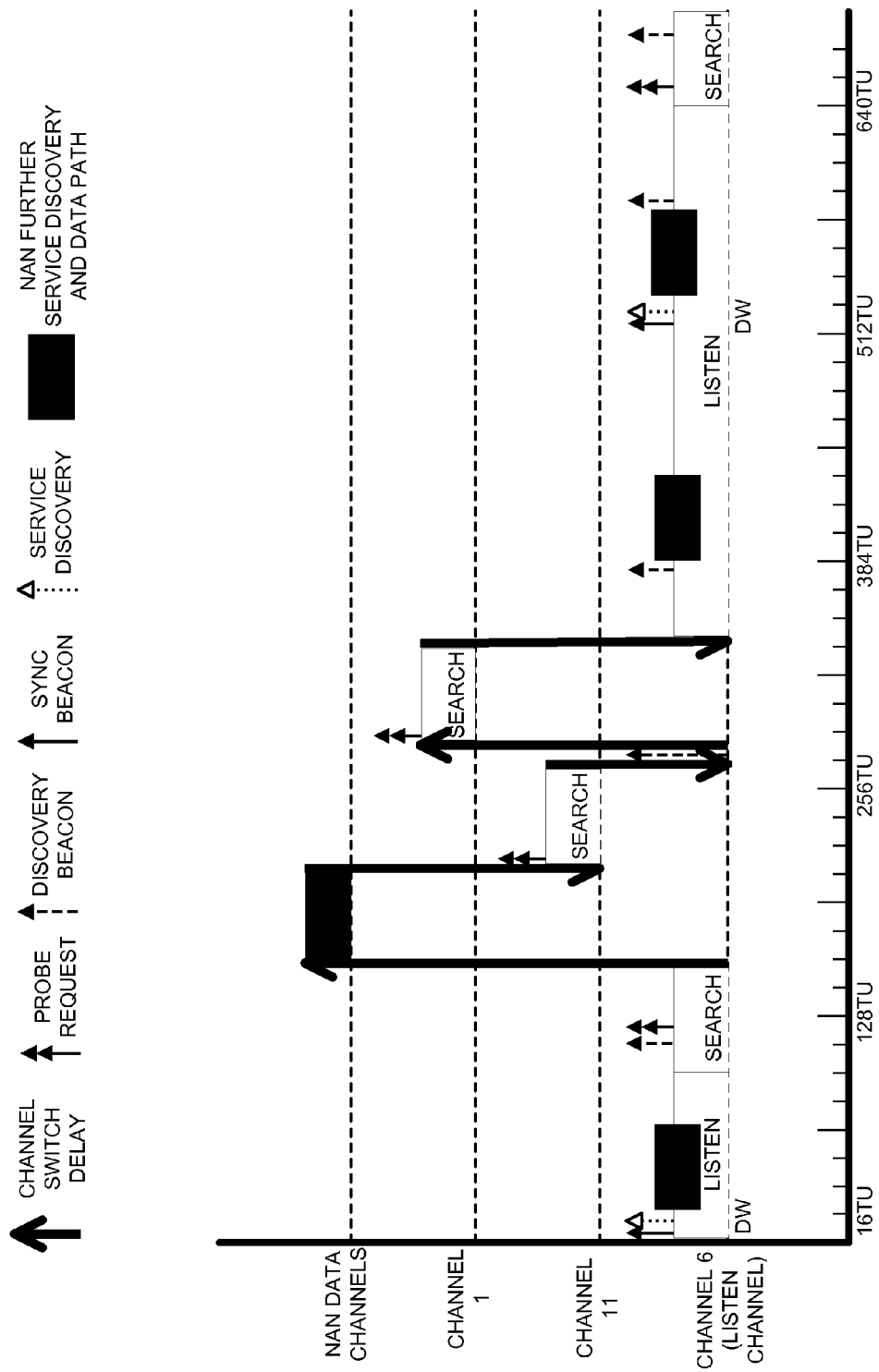
FIG. 5B presents a time graph illustrating an example schedule that coordinates NAN-specific operations with various operations for a find phase process.

FIG. 5B presents a time graph that illustrates an example schedule followed by coordinating device 110 as it progresses through the operations of the flowchart shown in FIG. 5A. In some embodiments, coordinating device 110 can enter a listen state to listen for WFD request frames from one or more other WFD devices until approximately 96 TU. Because coordinating device 110's listen channel is chosen to be channel 6 of the 2.4 GHz band in this example, coordinating device 110 may simultaneously attend a first discovery window for NAN network 150, which lasts until approximately 16 TU. While coordinating device 110 is in the listen state, coordinating device 110 may simultaneously participate in one or more post-discovery operations, which were scheduled during a previous discovery window to take place during a period from approximately 16 TU to approximately 64 TU on channel 6. Then, coordinating device 110 can enter a search state that lasts from approximately 96 TU to approximately 160 TU. While in the search state, coordinating device 110 may transmit a request frame and listen for a response frame. Because the channel that coordinating device 110 is searching in is channel 6, coordinating device 110 may perform a discovery beacon transmission for NAN network 150 during this period. Next, coordinating device 110 can switch to a temporary channel to perform one or more post-discovery operations that were scheduled to take place during a period from approximately 160 TU to approximately 208 TU on the temporary channel. Then, coordinating device 110 can switch to channel 11, transmit a request frame on the channel, and listen for a response frame. This search state can last from approximately 208 TU to 272 TU. Next, because a discovery beacon transmission is due for NAN network 150, coordinating device 110 can switch to channel 6 and perform a discovery beacon transmission. Next, coordinating device 110 can switch to channel 1, transmit a request frame on the channel, and listen for a response frame. This search state can last from approximately 288 TU to approximately 336 TU. At this point, because coordinating device 110 has searched channels 1, 6, and 11 and has not yet discovered another WFD device, coordinating device 110 can switch to channel 6 and enter into a listen state that lasts from approximately 336 TU to until approximately 640 TU. During the listen state, coordinating device 110 may transmit one or more discovery beacons, participate in one or more post-discovery operations, and attend one or more discovery windows on channel 6. Then, from approximately 640 TU, coordinating device 110 enters into a search state on channel 6.

In some embodiments, if a coordinating device determines that an upcoming listen period is scheduled to overlap with a discovery window that is to be performed in a NAN social channel in the 5 GHz band, the coordinating device may defer the listen period, opting to stay in a search period until after attending the discovery window. In some other embodiments, the coordinating device may simply choose not to attend the discovery window.

Coordinating WFD Network in Presence of NAN Network

Using communication environment 100 of FIG. 1 as an example, coordinating device 110 can hold controlling roles in both the NAN network and the WFD network. Accordingly, coordinating device 110 can schedule NAN-specific operations and WFD-specific operations in a way that reduces time and channel conflicts between NAN-specific operations and WFD-specific operations.

The flowchart in FIG. 6A illustrates how coordinating device 110 can simultaneously participate in NAN network 150 and WFD network 160 by: (1) staggering availability periods and absence periods for WFD network 160 in alternating time intervals, and (2) scheduling NAN-specific operations during the absence periods. To implement the absence periods, coordinating device 110 may include within beacon frames a Notice of Absence attribute that describes Notice of Absence timing. Alternatively, coordinating device 110 may communicate Notice of Absence timing directly by transmitting a Notice of Absence Action frame. The Notice of Absence timing is specified by a start time, interval, duration, and count fields in the Notice of Absence attribute. The start time field indicates the start time of the timing schedule. The interval field indicates the length of the timing schedule. The duration field indicates the length of each absence. Finally, the count field indicates the number of absences in the timing schedule.

Once the Notice of Absence timing has been implemented, the resulting schedule may proceed as follows. Coordinating device 110 enters an absence period (operation 604). During this time, WFD devices 120-122 may assume that coordinating device 110 is not available to them and avoid requesting coordinating device 110 to be present for a WFD-specific operation. Additionally, WFD devices 120-122 may enter a doze state to save power. As a result, the absence period provides coordinating device 110 time to perform one or more NAN-specific operations. For example, coordinating device 110 can transmit discovery beacons on the NAN social channel (operation 606), if needed, and attend one or more discovery windows (operation 608) on NAN network 150's social channel, if due. Coordinating device 110 is also available during absence periods to perform post-discovery operations on a temporary channel (operation 610), if scheduled.

Once the absence period ends, coordinating device 110 enters an availability period for WFD network 160 (operation 612). During availability periods, coordinating device 110 performs WFD-specific operations. For example, upon entering an availability period, coordinating device 110 can transmit a beacon at WFD network 160's operating channel (operation 614). For example, if coordinating device 110 chose channel 11 to be WFD network 160's operating channel, coordinating device 110 may transmit a beacon during each availability period on channel 11 to (among other things) assist newly arrived WFD devices in discovering WFD network 160. Once the availability period ends, coordinating device 110 enters another absence period for WFD network 160 (operation 604). Coordinating device 110 can continue to alternate between absence periods and availability periods.

Figure 6B:
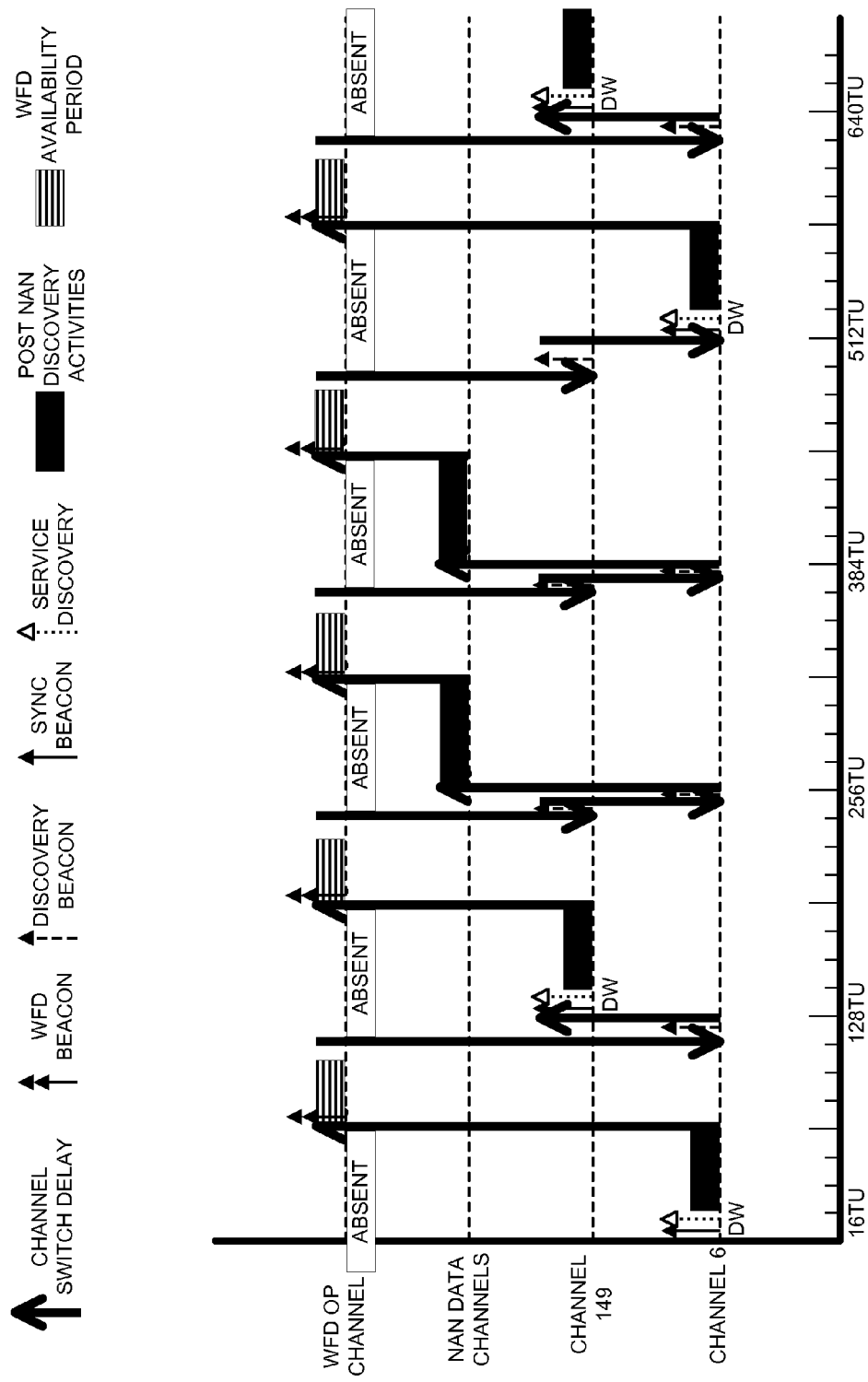
FIG. 6B presents a time graph illustrating an example schedule that coordinates NAN-specific operations with WFD-specific operations.
Figure 6C:
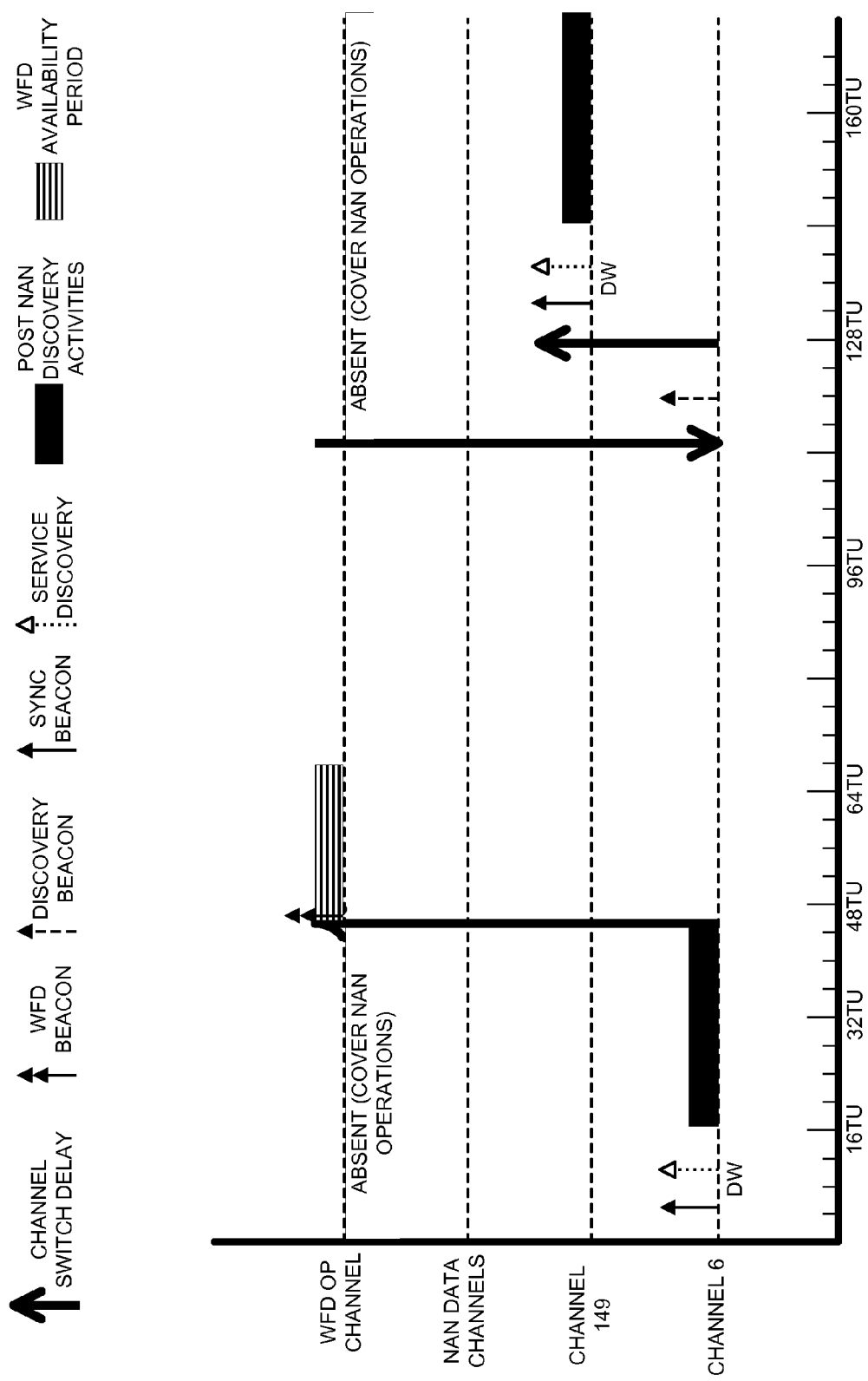
FIG. 6C presents a time graph illustrating an example schedule that coordinates NAN-specific operations with WFD-specific operations.

FIG. 6B presents a time graph that illustrates an example schedule followed by coordinating device 110 as it progresses through the operations of the flowchart shown in FIG. 6A. In some embodiments, coordinating device 110 can attend a discovery window on channel 6 of the 2.4 GHz band for NAN network 150, which lasts until approximately 16 TU. Next, coordinating device 110 may participate in one or more post-discovery operations, which were scheduled to take place in a period from approximately 16 TU to approximately 64 TU. During this period, coordinating device 110 may not be listening on WFD network 160's operating channel. This period of absence may be scheduled and communicated to other WFD devices. Next, coordinating device 110 may switch to WFD network 160's operating channel to perform WFD-specific operations. This availability period may last from approximately 64 TU to 112 TU. Then, coordinating device 110 can enter an absence period that may last from approximately 112 TU until 192 TU. During this absence period, coordinating device 110 may perform a discovery beacon transmission on channel 6 for NAN network 150 and then switch to channel 149 to attend a discovery window and participate in one or more post-discovery operations for NAN network 150. Next, coordinating device 110 may switch to WFD network 160's operating channel to perform WFD-specific operations. This availability period may last from approximately 192 TU to approximately 240 TU. Then, coordinating device 110 can enter an absence period that may last from approximately 240 TU to 320 TU. During this absence period, coordinating device 110 may switch to a temporary channel to participate in one or more post-discovery operations for NAN network 150, which were schedule to take place on the temporary channel during a period from approximately 256 TU to 320 TU. From 320 TU, coordinating device 110 continues to alternate between availability periods and absence periods to simultaneously participate in both NAN network 150 and WFD network 160. FIG. 6C presents a version of the time graph presented by FIG. 6B that is magnified with respect to time.

The flowchart in FIG. 7A illustrates a variation of the example flowchart illustrated in FIG. 6A. In FIG. 7A, coordinating device 110 may shrink absence periods by scheduling one or more post-discovery operations to take place on WFD network 160's operating channel. By having post-discovery operations occur on the same channel, coordinating device 110 may perform both post-discovery operations and WFD-specific operations during availability periods. As a result, in time periods where post-discovery operations are scheduled to occur and where discovery windows are not scheduled, coordinating device 110 may (1) move the post-discovery operation to WFD network 160's operating channel, (2) extend the duration of the availability period to include the post-discovery operation, and (3) shrink the period of absence to only cover the transmission of a discovery beacon.

At the start of an absence period (operation 706), coordinating device 110 may transmit a NAN discovery beacon on NAN network 150's social channel (e.g., channel 6) to fulfill the NAN network's discovery beacon density requirement (operation 708). If a NAN discovery window is scheduled during this absence period (decision 710), coordinating device 110 attends the discovery window (operation 712) on the designated NAN social channel and performs any scheduled neighboring post-discovery operations (operation 714) on NAN network 150's social channel. Once the absence period is over, coordinating device 110 enters an availability period (operation 716), and can switch channels and transmit a beacon on the WFD network 160's operating channel (operation 718). Alternatively, if a discovery window is not scheduled during this absence period (decision 710), the absence period is truncated in the WFD operating schedule, thereby allowing coordinating device 110 to enter and stay in a subsequent availability period (operation 720) for a longer period of time. During this extended availability period, coordinating device 110 may handle post-discovery operations on a WFD operating channel, e.g., channel 11 (operation 722). Before transitioning to the next absence period (operation 706), coordinating device 110 may transmit a beacon over WFD network 160's operating channel (operation 718).

Figure 7B:
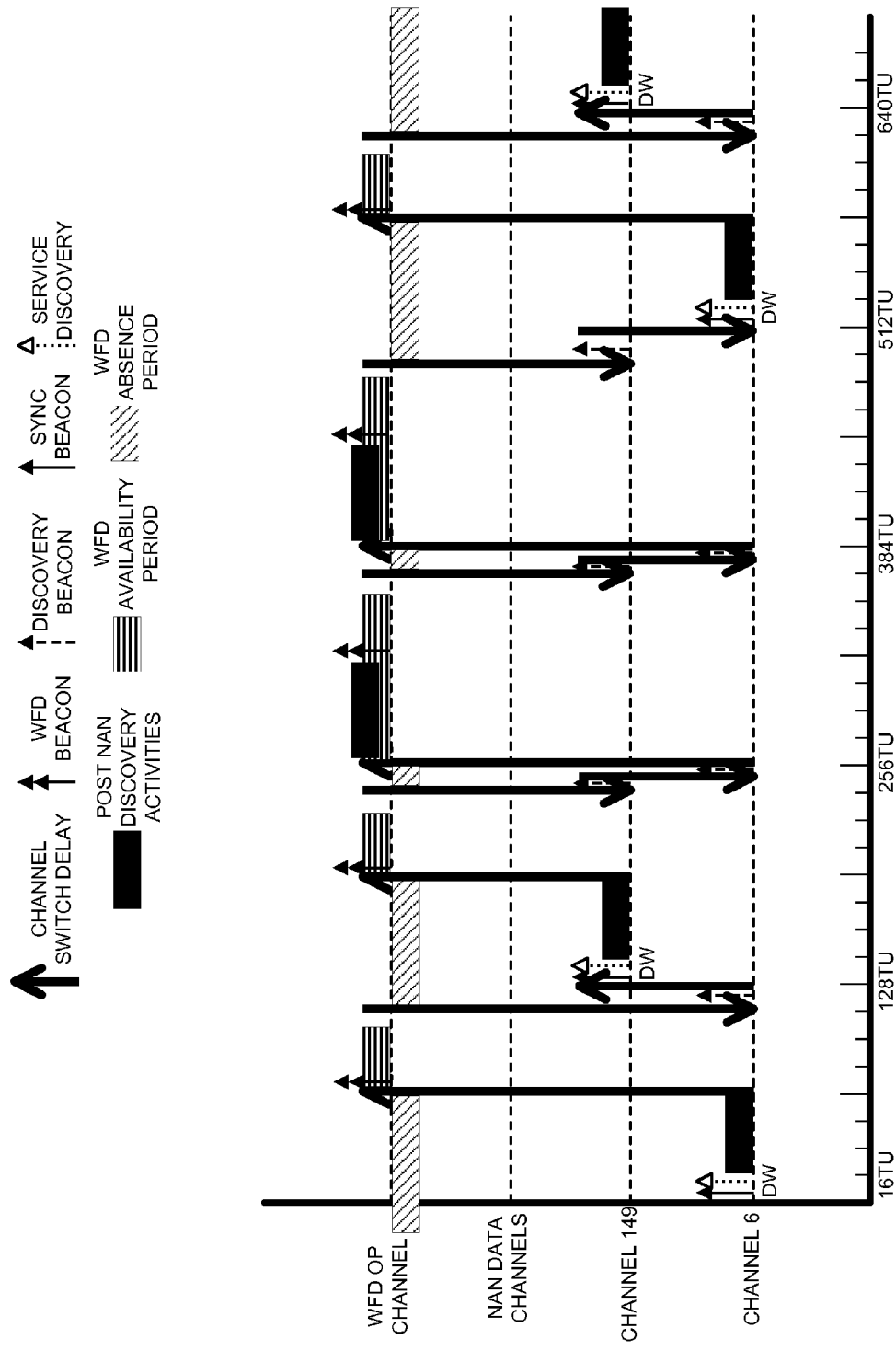
FIG. 7B presents a time graph illustrating an example schedule that uses additional optimizations to coordinate NAN-specific operations with WFD-specific operations.
Figure 7C:
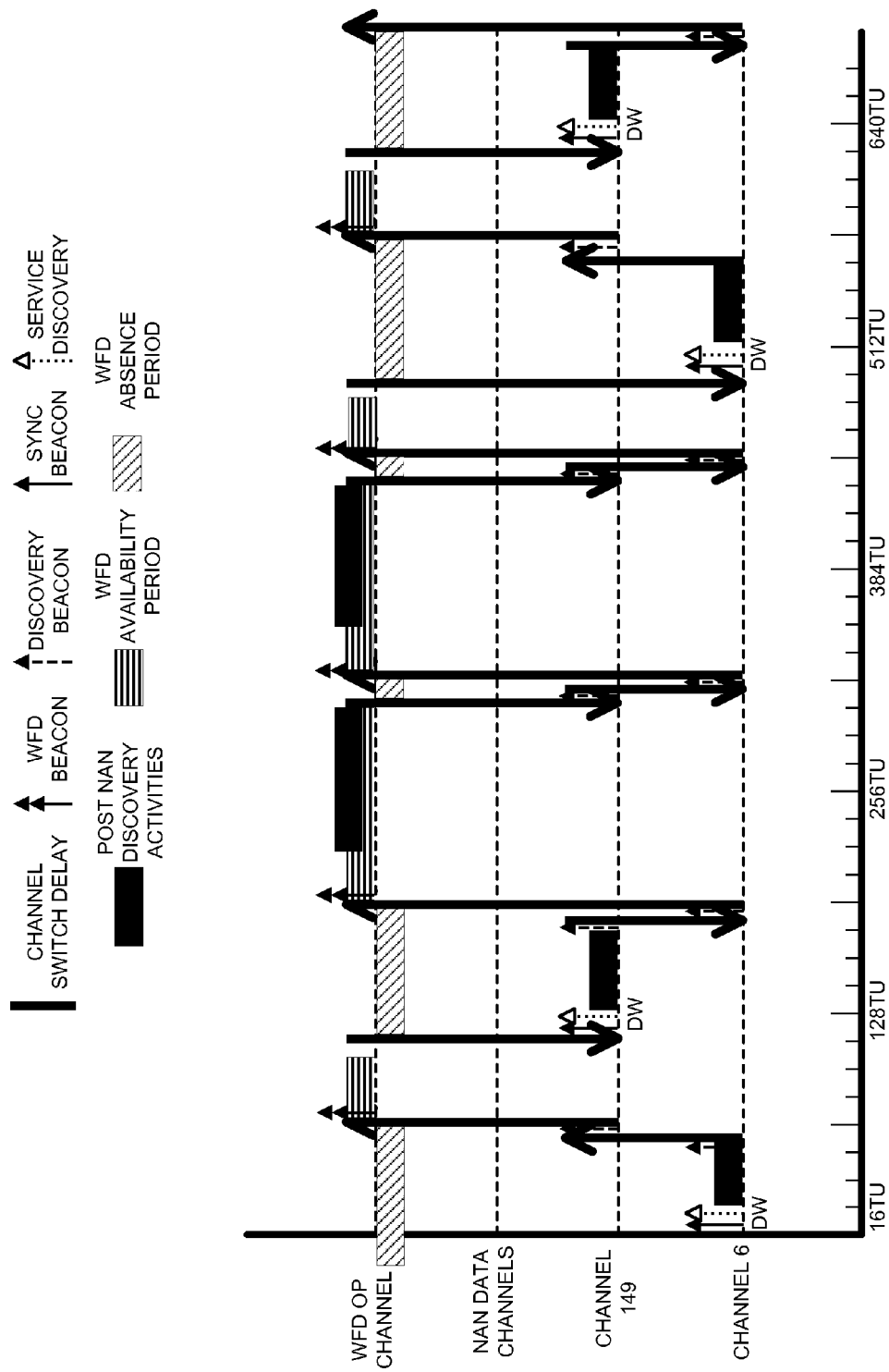
FIG. 7C presents a time graph illustrating an example schedule that uses additional optimizations to coordinate NAN-specific operations with WFD-specific operations.

FIGS. 7B and 7C present time graphs that illustrate example schedules followed by coordinating device 110 as it progresses through the operations of the flowchart shown in FIG. 7A. As shown in FIG. 7B, coordinating device 110 initially follows a schedule that closes resembles the schedule shown in FIG. 6B. However, at approximately 256 TU, instead of switching to a temporary channel to participate in one or more post-discovery operations, coordinating device 110 switches to WFD network 160's operating channel, where coordinating device 110 may perform WFD-specific operations and/or participate in post-discovery operations for NAN network 150. By scheduling post-discovery operations to take place on WFD network 160's operating channel rather than on a different temporary channel, coordinating device 110 may reduce absence periods.

Another modification that coordinating device 110 can implement is setting WFD network 160's operating channel to NAN network 150's social channel. In doing so, coordinating device 110 may reduce channel switching and the amount of time coordinating device 110 spends in absence periods to perform NAN-specific operations. Note, however, that this modification may not be implemented if NAN network 150's social channel is congested.

The environment in which some embodiments are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments have been presented for purposes of illustration and description only. They are not intended to be exhaustive or to limit the disclosure to the forms disclosed. Accordingly, many modifications and variations will be apparent to practitioners skilled in the art.

What is claimed is:

1. A device comprising:
a wireless interface for conducting wireless communications;
wherein the device is configured to:
participate in a first peer-to-peer (P2P) network through the wireless interface using a first communications protocol;
participate in a second P2P network using a second P2P communications protocol; and
modify a network parameter of the first P2P network or a network parameter of the second P2P network to reduce an occurrence of conflicts between the first P2P network and the second P2P network, wherein the modifying causes an operation of the first P2P network to be performed during an absence period in a schedule of operation of the second P2P network, wherein the absence period comprises an interval of time where a group owner of the second P2P network is absent from the second P2P network.

2. The device of claim 1, wherein the device is further configured to set a master preference value in the first communication protocol to indicate a strong preference for acting as a master in the first P2P network.

3. The device of claim 1, wherein:
the device operates as a master device in the first P2P network; and
the device operates as a group owner in the second P2P network.

4. The device of claim 1, wherein the modifying comprises:
modifying a beacon interval of the second P2P network to align with the first P2P network.

5. The device of claim 1, wherein the modifying causes the first P2P network and the second P2P network to operate over a same wireless channel, and wherein the modifying comprises:
setting an operating channel of the second P2P network to a social channel of the first P2P network based on the social channel of the first P2P network being sufficiently uncongested; and
performing post-discovery operations of the first P2P network on the operating channel of the second P2P network.

6. The device of claim 1, wherein the modifying comprises setting a beacon interval for the first P2P network that is longer than a default interval in the first P2P network, wherein after setting the beacon interval for the first P2P network:
all time intervals between discovery beacon transmissions of the first P2P network are less than or equal to 256 time units (TU); and
an average of one discovery beacon transmission occurs every 128 TU on the first P2P network.

7. The device of claim 1, wherein the modifying comprises at least one of:
canceling a discovery operation that is to be performed in a 5 gigahertz (GHz) channel of the first P2P network;
scheduling a passive scan of the second P2P network in a time interval where no post-discovery operations of the first P2P network are scheduled; and scheduling an active scan of the second P2P network in a time interval where post-discovery operations of the first P2P network are scheduled.

8. The device of claim 1, wherein the modifying comprises at least one of:
if a listen period of the second P2P network is scheduled to overlap with a discovery operation that is to be performed in a 5 GHz channel of the first P2P network: cancelling the discovery operation; or
deferring the listen period until after the discovery operation is performed;
if a listen period of the second P2P network is scheduled to overlap with a post-discovery operation of the first P2P network, which is to be performed on a different channel than where the listen period is to take place:
modifying the post-discovery operation to be performed on the listen period's channel; or
deferring the listen period until after the post-discovery operation is performed; and
if a search period of the second P2P network, which comprises a plurality of active scans across multiple channels, is scheduled to overlap with an operation of the first P2P network, interleaving the operation of the first P2P network with the active scans.

9. The device of claim 1, wherein:
operations of the first P2P network comprise first P2P discovery operations and first P2P post-discovery operations, wherein the first P2P discovery operations comprise transmitting a P2P discovery beacon and attending a P2P discovery window and the first P2P post-discovery operations comprise service discovery and data-path operations.

10. The device of claim 1, wherein the first P2P communications protocol is Neighbor Awareness Networking (NAN).

11. The device of claim 1, wherein the second P2P communications protocol is Wi-Fi Direct (WFD).

12. The device of claim 1, wherein the modifying comprises:
scheduling multiple differently sized absence periods in the second P2P network during a sequence of discovery windows in the first P2P network, thereby allowing operation of the first P2P network during the absence periods.

13. A computer-implemented method, the method comprising, at a first device:
participating in a first peer-to-peer (P2P) network using a first communications protocol;
participating in a second P2P network using a second P2P communications protocol; and
modifying a network parameter of the first P2P network or a network parameter of the second P2P network to reduce an occurrence of conflicts between the first P2P network and the second P2P network, wherein the modifying causes an operation of the first P2P network to be performed during an absence period in a schedule of operation of the second P2P network, wherein the absence period comprises an interval of time where a group owner of the second P2P network is absent from the second P2P network.

14. The computer-implemented method of claim 13, wherein the modifying comprises:
setting a beacon interval for the first P2P network that is longer than a default interval in the first P2P network.

15. The computer-implemented method of claim 13, wherein the modifying comprises:
modifying a beacon interval of the second P2P network to align with the first P2P network.

16. The computer-implemented method of claim 13, wherein the modifying causes the first P2P network and the second P2P network to operate over a same wireless channel, and wherein the modifying comprises:
setting an operating channel of the second P2P network to a social channel of the first P2P network based on the social channel of the first P2P network being sufficiently uncongested; and
performing post-discovery operations of the first P2P network on the operating channel of the second P2P network.

17. The computer-implemented method of claim 13, wherein the modifying comprises at least one of:
if a listen period of the second P2P network is scheduled to overlap with a discovery operation that is to be performed in a 5 GHz channel of the first P2P network: cancelling the discovery operation; or
deferring the listen period until after the discovery operation is performed;
if a listen period of the second P2P network is scheduled to overlap with a post-discovery operation of the first P2P network, which is to be performed on a different channel than where the listen period is to take place:
modifying the post-discovery operation to be performed on the listen period's channel; or
deferring the listen period until after the post-discovery operation is performed; and
if a search period of the second P2P network, which comprises a plurality of active scans across multiple channels, is scheduled to overlap with an operation of the first P2P network, interleaving the operation of the first P2P network with the active scans.

18. A non-transitory computer-readable medium storing instructions that, when executed by a computer, cause the computer to perform a method, the method comprising, at a first device:
participating in a first peer-to-peer (P2P) network using a first communications protocol;
participating in a second P2P network using a second P2P communications protocol; and
modifying a network parameter of the first P2P network or a network parameter of the second P2P network to reduce an occurrence of conflicts between the first P2P network and the second P2P network, wherein the modifying causes an operation of the first P2P network to be performed during an absence period in a schedule of operation of the second P2P network, wherein the absence period comprises an interval of time where a group owner of the second P2P network is absent from the second P2P network.

19. The device of claim 1, wherein the operation of the first P2P network comprises a Neighbor Awareness Networking (NAN) operation or a Wi-Fi Direct (WFD) operation.

20. The device of claim 19, wherein the operation of the first P2P network comprises at least one of attending a NAN discovery window, transmitting a NAN discovery beacon, or transmitting a WFD beacon.

* * * * *